United States Patent
Hinchley et al.

(10) Patent No.: US 7,042,875 B2
(45) Date of Patent: May 9, 2006

(54) SYSTEM AND METHOD FOR HIGH-SPEED SWITCHING

(75) Inventors: Ronald Edward Hinchley, San Jose, CA (US); Tun-I Kok, San Jose, CA (US)

(73) Assignee: Conexant, Inc., Red Bank, NJ (US)

( * ) Notice: Subject to any disclaimer, the term of this patent is extended or adjusted under 35 U.S.C. 154(b) by 984 days.

(21) Appl. No.: 10/090,865

(22) Filed: Mar. 4, 2002

(65) Prior Publication Data
US 2002/0167944 A1 Nov. 14, 2002

Related U.S. Application Data

(60) Provisional application No. 60/282,584, filed on Apr. 9, 2001.

(51) Int. Cl.
*H04L 12/50* (2006.01)
(52) U.S. Cl. ........................ 370/386; 370/387
(58) Field of Classification Search ........... None
See application file for complete search history.

(56) References Cited

U.S. PATENT DOCUMENTS

| 5,394,407 A | * | 2/1995 | Coddington | ........... 714/752 |
| 5,815,690 A | * | 9/1998 | Kowert et al. | ........... 713/401 |
| 6,335,930 B1 | * | 1/2002 | Lee | ........... 370/387 |

* cited by examiner

*Primary Examiner*—Duc Ho
(74) *Attorney, Agent, or Firm*—Thomas, Kayden, Horstemeyer & Risley

(57) ABSTRACT

A high-speed switching system and method are presented, wherein an n-to-1 switch is configured to receive n data inputs, choose a single data output from the received n data inputs, and output the chosen data output. In a preferred embodiment, the system is configured as a modular system having multiple 2-to-1 switches that are cascaded together in binary-tree fashion, thereby allowing for a simpler implementation over a wide range of n. The system and method also provide an approach for providing a data valid signal, which indicates whether or not the chosen data output is expected.

28 Claims, 6 Drawing Sheets

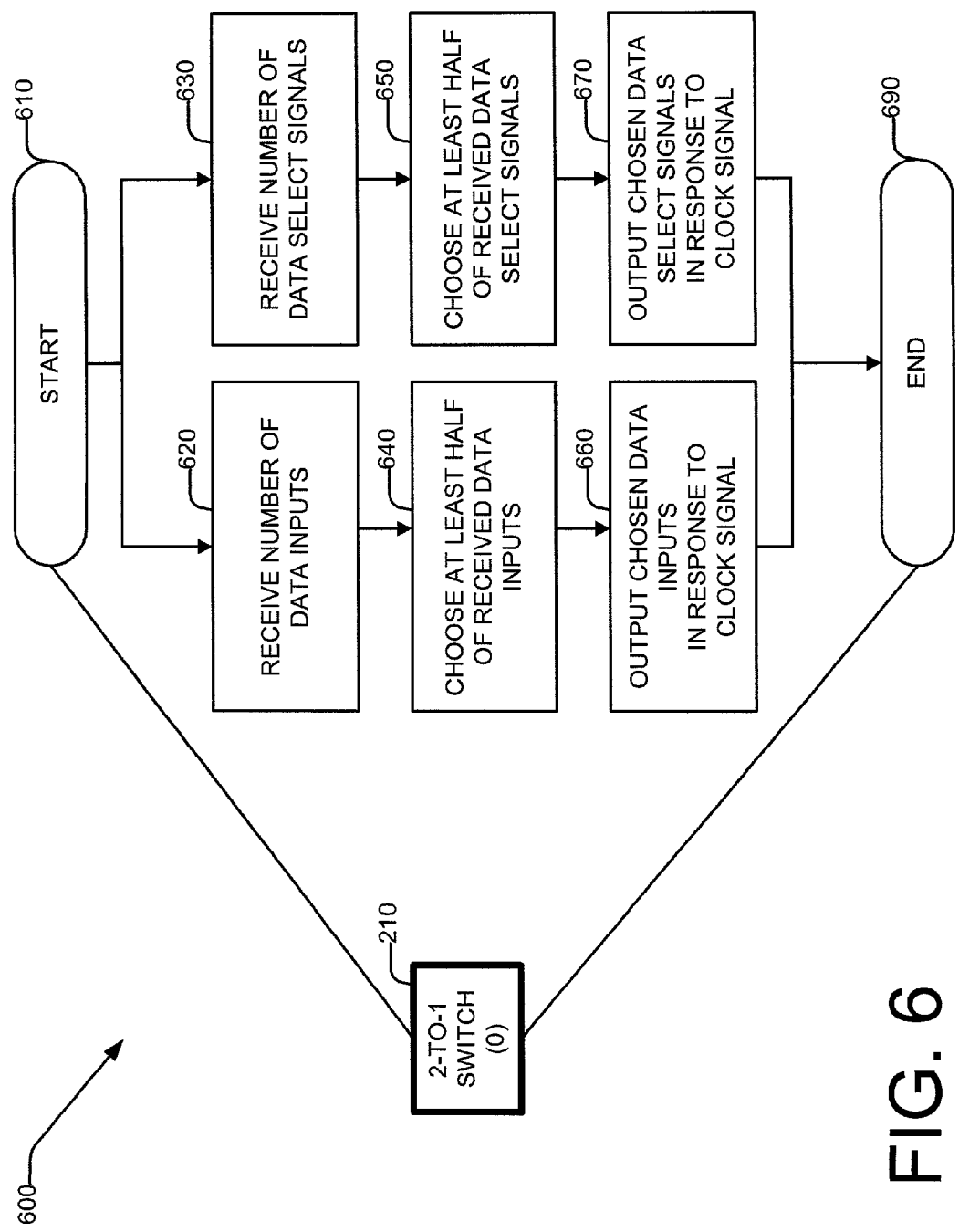

SYSTEM AND METHOD FOR HIGH-SPEED SWITCHING

CROSS REFERENCE TO RELATED APPLICATIONS

This application claims the benefit of U.S. Provisional Patent Application No. 60/282,584, having the title "High Speed Multiplexing Switch" and dated Apr. 9, 2001, which is incorporated herein by reference in its entirety.

FIELD OF INVENTION

The present invention is generally related to data communications and, more particularly, is related to a high-speed switching system and method.

BACKGROUND

In typical interconnected networks, data is switched from one path to another using a branching or path-shifting network. In such an environment, "n" inputs are directed to a multitude of different (i.e., "n") outputs. In one example, as shown in FIG. 1, the n-inputs 104 are directed through 1-to-n switches 108, and, subsequently, relayed to n-to-1 switches 154 through a number of connections 150. These n-to-1 switches 154 then generate appropriate outputs 158.

As the number of inputs 104 increases, the branching losses (or path losses) become increasingly problematic. Thus, as the complexity of the data path 150 increases, the probability of data loss increases concomitantly. Thus, a heretofore-unaddressed need exists in the industry to address the aforementioned problem.

SUMMARY

The present invention provides a high-speed switching system and method.

Briefly described, in architecture, one embodiment can be viewed as a switching system having a plurality of switching layers, wherein each layer selects a decreasing number of signals until only one signal is chosen and outputted by the last layer. In another embodiment, each of the switching layers has a plurality of switches that operate in parallel. In a preferred embodiment, each of these switches are identical, thereby allowing for a modular switching system that may accommodate any desired number of inputs or outputs without much increase in complexity.

The present invention can also be viewed as providing a method for high-speed switching. In this regard, one embodiment of such a method comprises the steps of receiving a number of data inputs, choosing at least half of the received data inputs, and outputting the chosen data inputs. In another embodiment, the process would repeat itself until there is only one outputted data.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a flowchart showing another embodiment of the method of the invention.

DETAILED DESCRIPTION OF DRAWINGS

Figure 1:
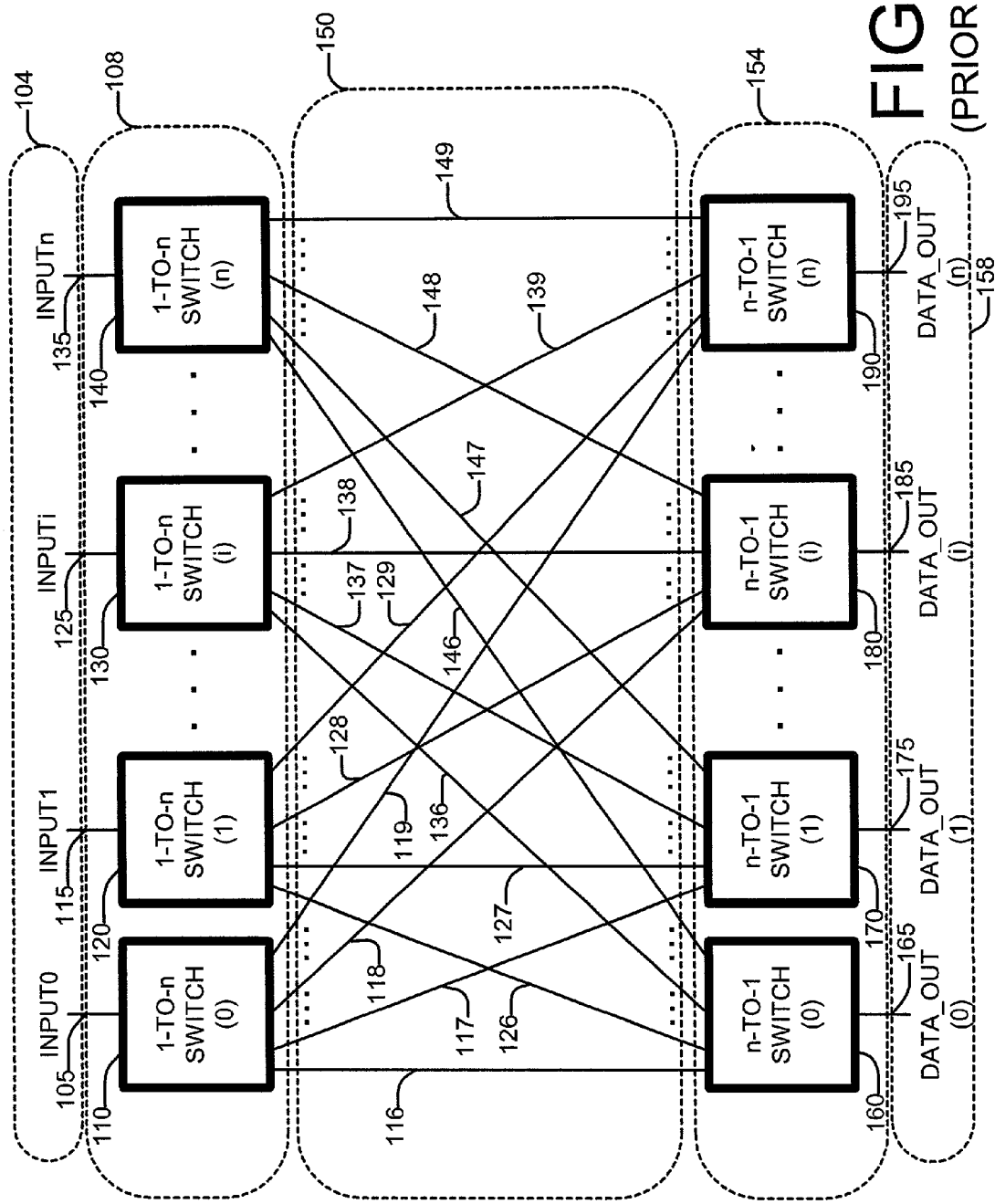
FIG. 1 is a block diagram showing an example interconnected-network as known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 2:
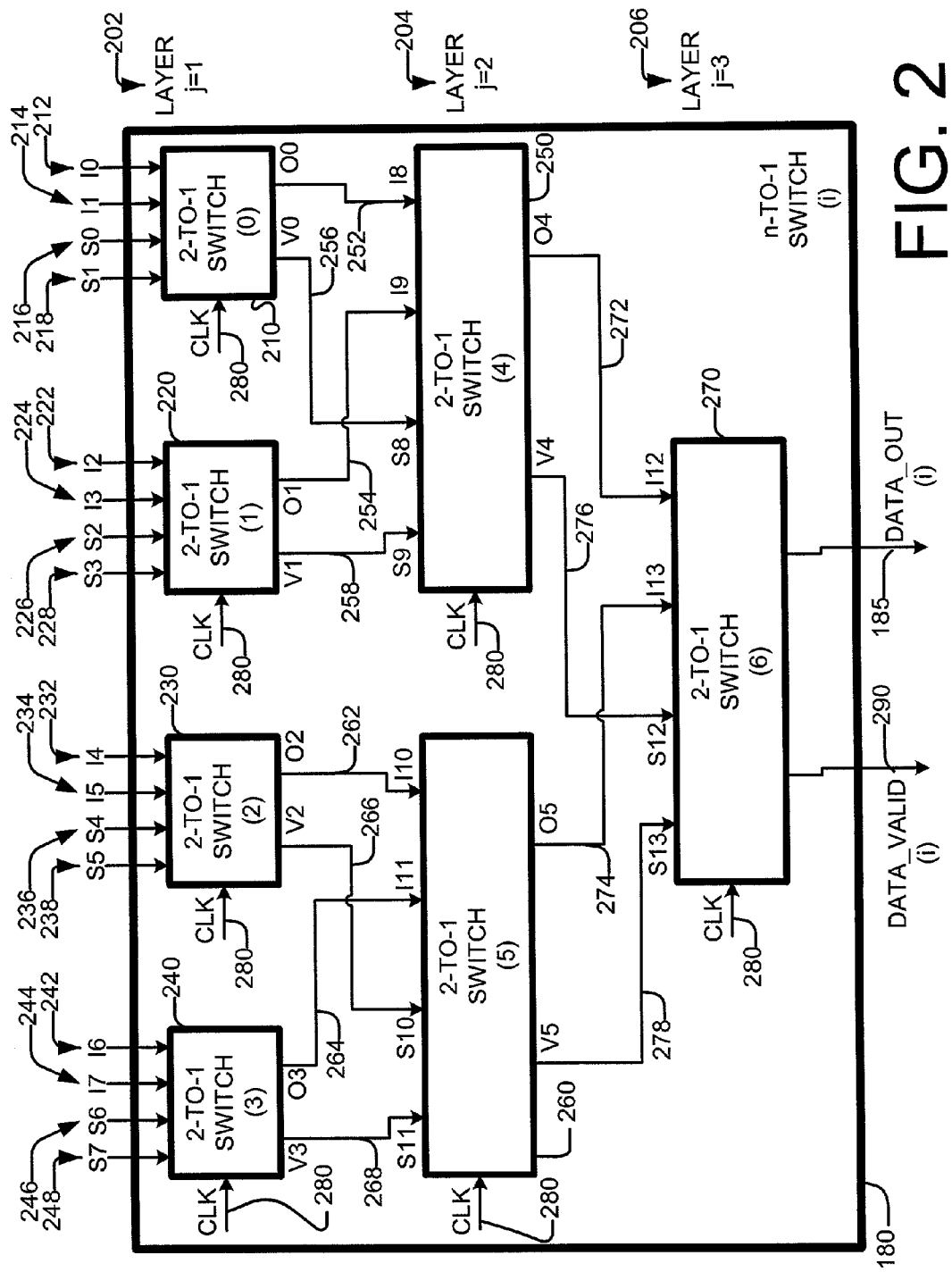
FIG. 2 is a block diagram showing one embodiment of the system, wherein a plurality of switching layers are shown within a switching system.

FIG. 2 is a block diagram showing one embodiment of the system, wherein a plurality of switching layers 202, 204, 206 are shown within a switching system 180 (e.g., an n-to-1 switch). As shown in the non-limiting example of FIG. 2, an n-to-1 switch 180 is configured to receive a number of data inputs 212, 214, 222, 224, 232, 234, 242, 244 as well as a number of data select signals 216, 218, 226, 228, 236, 238, 246, 248. For purposes of illustration, the system is configured with eight data inputs 212, 214, 222, 224, 232, 234, 242, 244 and eight data select signals 216, 218, 226, 228, 236, 238, 246, 248. However, it will be clear to one of ordinary skill in the art that the n-to-1 switch may accommodate any desired number of data inputs and data selects signals. Each of these eight data inputs 212, 214, 222, 224, 232, 234, 242, 244 and eight data select signals 216, 218, 226, 228, 236, 238, 246, 248 is input to a first layer 202 (i.e., layer j=1). The first layer 202 is configured to choose four data inputs and four data select signals and output the chosen data inputs and data select signals for use by a second layer 204 (i.e., layer j=2). In other words, the output of the first layer 202 serves as the input to the second layer 204. In the non-limiting example of FIG. 2, the first layer 202 has four switches 210, 220, 230, 240 that are configured as 2-to-1 switches. Thus, each switch 210, 220, 230, 240 is configured to receive two data inputs, select one of the two data inputs, and output the one selected data input. Additionally, each switch is configured to receive two data select signals and output one of the two data select signals. Hence, as shown in FIG. 2, the four switches 210, 220, 230, 240 are sufficient to propagate the eight data inputs 212, 214, 222, 224, 232, 234, 242, 244 and eight data select signals 216, 218, 226, 228, 236, 238, 246, 248 to the next layer 204.

Once the eight data inputs 212, 214, 222, 224, 232, 234, 242, 244 and eight data select signals 216, 218, 226, 228, 236, 238, 246, 248 have been reduced to four data inputs 272, 274 and four data select signals 276, 278, the first layer 202 relays the four data inputs 272, 274 and four data select signals 276, 278 to the second layer 204. The second layer 204 is configured to receive the four data inputs 272, 274 from the first layer 202, choose two of the four data inputs 272, 274, and output the chosen two data inputs. Additionally, the second layer is configured to receive the four data select signals 276, 278 from the first layer 202 and output two data select signals. In this sense, the second layer 204 has two switches 250, 260 that are configured as 2-to-1 switches, thereby allowing propagation of the four data inputs 272, 274 and the four data select signals 276, 278 to the third layer 206.

Once the four data inputs 272, 274 and the four data select signals 276, 278 have been reduced to two data inputs 272, 274 and two data select signals 276, 278, the second layer 204 relays the two data inputs 272, 274 and two data select signals 276, 278 to the third layer 206. The third layer 206 is configured to receive the two data inputs 272, 274 from the second layer 204, choose one of the two data inputs 272, 274, and output the chosen one data input as a data output 185. Additionally, the third layer is configured to receive the two data select signals 276, 278 from the second layer 204 and output one data select signal as a data valid signal 290. In this sense, the third layer 206 has one switches 270 that is configured as a 2-to-1 switch, thereby allowing propagation of the two data inputs 272, 274 and the two data select signals 276, 278 to the third layer 206.

As shown in FIG. 2, since each layer is configured to reduce the number of signals and propagate the reduced signals to the next layer, it is possible that the optimum number of switches and layers may be calculated. Thus, while the non-limiting example has eight pairs of inputs (i.e., eight data inputs 212, 214, 222, 224, 232, 234, 242, 244 and eight data select signals 216, 218, 226, 228, 236, 238, 246, 248), a general system may be represented as having n pairs of inputs (i.e., n data inputs and n data select signals). For such a system, if each switch is configured as a 2-to-1 switch, the number of layers would be represented as:

$$K = \text{int}^+(\log_2(n)) \quad \text{[Eq. 1]},$$

wherein n is the number of inputs, K is the number of layers, and $\log_2$ is a logarithmic function in base 2, and $\text{int}^+$ represents a rounding up of $\log_2(n)$ to the nearest integer value. Stated differently, if there are $2^K$ input pairs, then K layers would be sufficient to reduce the $2^K$ input pairs to the single data output 185 and the single data valid signal 290. Additionally, if each layer has an index j (i.e., layer one is indexed by j=1; layer two is indexed by j=2; layer three is indexed by j=3; etc.), and each switch is a 2-to-1 switch, then each $j^{th}$ layer would have $2^{K-j}$ switches. Thus, for the non-limiting example of FIG. 2, n=8, K=3, layer j=1 has $2^{3-1}=2^2=4$ switches, layer j=2 has $2^{3-2}=2^1=2$ switches, and layer j=3 has $2^{3-3}=2^{0=1}$ switch.

An even more general system may be represented, where each switch is a general m-to-1 switch (i.e., m-input-one-output switch). In such a case, the number of layers K would be represented by:

$$K = \text{int}^+(\log_m(n)) \quad \text{[Eq. 2]},$$

wherein m is the number designating the number of inputs to each switch. Thus, for such a system, it would be sufficient for each $j^{th}$ layer of the K layers to have $m^{K-j}$ m-to-1 switches. While such general m-to-1 switches may be employed, the 2-to-1 switch is chosen for the preferred embodiment because of its simplicity of design and simplicity of arrangement in an n-to-1 switching system. Thus, while a general m-to-1 switch system is described by Eqs. 1 and 2, the preferred embodiment employs a 2-to-1 switch.

Figure 3:
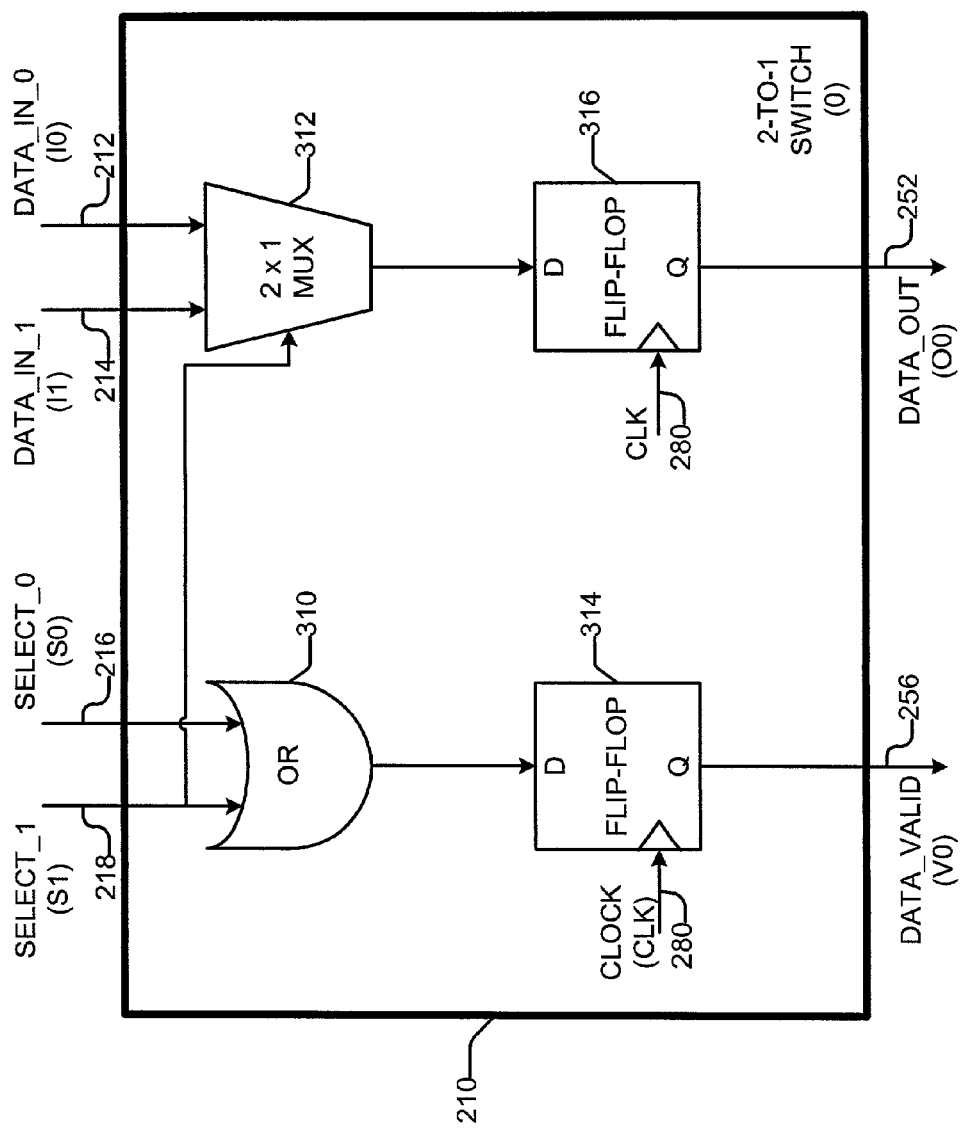
FIG. 3 is block diagram showing one of the switches of FIG. 2 in greater detail.

FIG. 3 is block diagram showing another embodiment of the invention. While FIG. 2 shows modular cascaded switches as one embodiment of the system, the system may also be seen, in another embodiment, as one of the modular switches. One non-limiting example of such an embodiment is a 2-to-1 switch 210 as shown in FIG. 3. In this non-limiting example, the 2-to-1 switch 210 comprises a logical OR gate 310, a 2×1 multiplexer (MUX) 312 (i.e., a two-input-one-output MUX), a first flip-flop 314, and a second flip-flop 316. The logical OR gate 310 is configured to receive two data select signals 216, 218 and produce the logical OR result from the two received data select signals 216, 218. Since the logical OR result is either a binary 0 or a binary 1, the result of the logical OR function is equivalent to choosing the "high" input of the two data select signals (i.e., if either input is "high," then the output is "high"; if both inputs are "low," then the output is "low"). The output of the logical OR gate 310 is sent to the first flip-flop 314.

The 2×1 MUX 312 is configured to receive two data inputs 212, 214 as well as one of the data select signals 218. The first data select signal (or S0) 216 indicates that there is a valid first data input (or I0) 212 while the second data select signal (or S1) 218 indicates that there is a valid second data input (or I1) 214. Thus, the 2×1 MUX 312 receives the data inputs 212, 214 at approximately the same time that the logical OR gate 310 receives the data select signals 216, 218. The 2×1 MUX selects one of the two received data inputs 212, 214 in response to the received data select signal 218, and outputs the selected data input. This output from the 2×1 MUX 312 is sent to the second flip-flop 316.

The first flip-flop 314 receives the output from the logical OR gate 310 and stores the logical OR information, while the second flip-flop 316 receives the output from the 2×1 MUX 312 and stores the MUX information. Each of these flip-flops 314, 316 releases the stored information when a clock 280 triggers the flip-flops 314, 316. Thus, both flip-flops 314, 316 release the stored information at approximately the same time. The information from the second flip-flop 316 is designated as the data output (or O0) 252 since it is the output of the selected data input. The information from the first flip-flop 314 is designated as a data valid signal (or V0) 256 since it indicates whether or not there is valid information from the second flip-flop 316. In a preferred embodiment, the flip-flops 314, 316 are configured to release the stored information at a rising edge of the clock signal 280. However, it will be clear to one of ordinary skill in the art that the trigger may be implemented as the falling edge of the clock signal 280.

As shown from FIG. 3, the 2-to-1 switch 210 has a very simple structure that is very robust and easy to implement. Additionally, the simplicity of the structure allows scalability of a system using the 2-to-1 switch 210 (i.e., the 2-to-1 switch is modular). Moreover, since the select signal 218 (or 216) for the 2×1 MUX 312 is propagated through the 2-to-1 switch, the system also provides notification of valid data. The two flip-flops 314, 316 also provide a constant insertion delay and allow for gaps in the data. Moreover, the logical OR gate 310 and 2×1 MUX 312 combination eliminates the need for arbitration. In this sense, the shortcomings of the prior art are addressed in the modular 2-to-1 switch 210 of FIG. 3 while providing other advantages.

Figure 4:
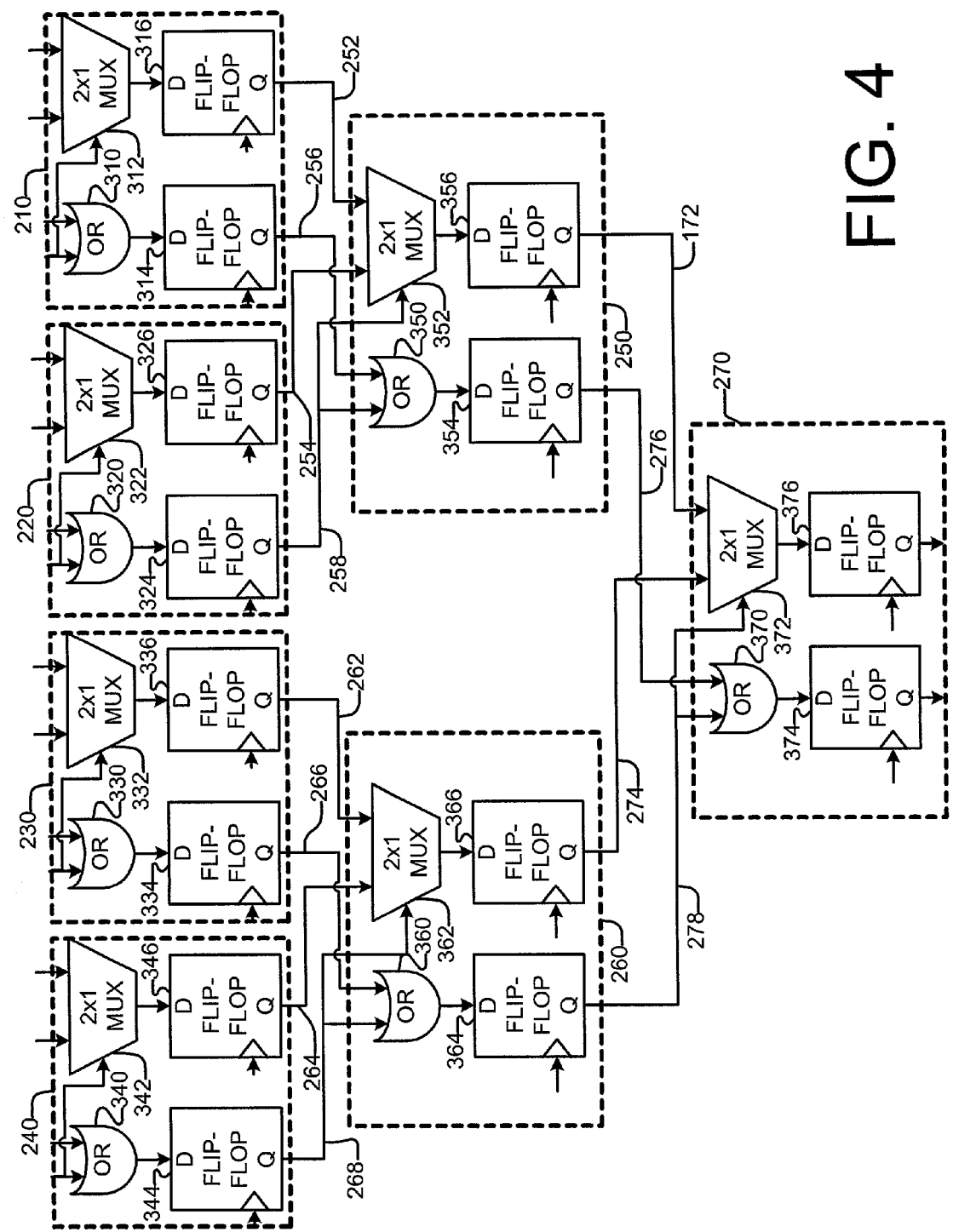
FIG. 4 is a block diagram showing a component view of the block diagram of FIG. 2.

FIG. 4 is a block diagram showing a component view of the block diagram of FIG. 2. In short, FIG. 4 shows the switches 210, 220, 230, 240, 250, 260, 270 of FIG. 2 as being implemented using the modular 2-to-1 switch 210 of FIG. 3. Since the 2-to-1 switch 210 is described in detail with reference to FIG. 3 and the switching layers 202, 204, 206 and the switching system 180 (i.e., the n-to-1 switch) are described in detail with reference to FIG. 2, only a description is provided with reference to FIG. 4. It is, however, worthwhile to note that the ease of implementation, scalability, and the robustness can be seen from the arrangement of FIG. 4.

Having discussed several embodiments of the system of the invention, several non-limiting embodiments of the method of the invention are described with reference to FIGS. 5 and 6.

Figure 5:
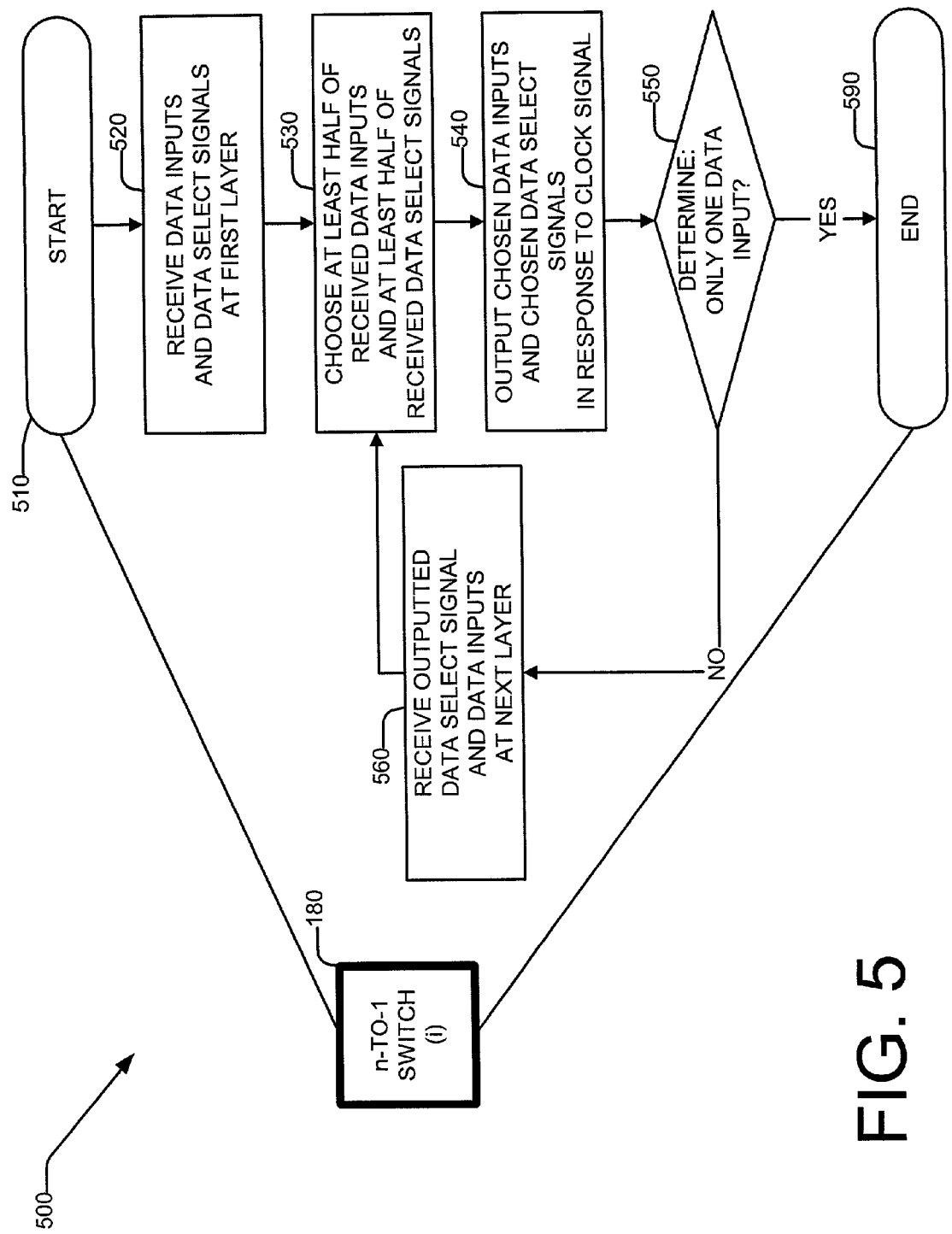
FIG. 5 is a flowchart showing one embodiment of the method of the invention.

FIG. 5 is a flowchart showing one embodiment of the method of the invention. This embodiment of the method describes steps that are carried out by the n-to-1 switching system 180. The system, in step 520, receives data inputs and data select signals at a first layer 202 (FIG. 2) of switches 210 (FIG. 2), 220 (FIG. 2), 230 (FIG. 2), 240 (FIG. 2). The system then chooses, in step 530, at least half of the received 520 data inputs and at least half of the received data select signals. These chosen data select signals and data inputs are then output, in step 540, in response to a clock signal 280 (FIG. 3). In one embodiment of the invention, the outputting step 540 is responsive to a rising edge of the clock signal 280 (FIG. 3). However, the system may alternatively be configured to output 540 the stored information at a falling edge of the clock signal 280 (FIG. 3). Once the data has been outputted 540 from the first layer, the system determines, in step 550, whether there is more than one data input that has been propagated through that layer. If there has only been one data input that is propagated through the layer (i.e., there is only one data output), then the process ends because the system has the data output 185 and the data valid signal 290. If, on the other hand, there is more than one data input that is propagated through the layer, then the system receives, in step 560, the outputted data select signals and the data inputs at the next layer, and repeats the process from step 530 (i.e., the choosing step). As one can see, the process that is outlined in FIG. 5 provides a simple and robust switching method.

FIG. 6 is a flowchart showing another embodiment of the method of the invention. This embodiment of the method describes steps that are carried out by the 2-to-1 switch 210 (FIG. 3). For simplicity, the method is shown as two parallel processes that deal separately with the data inputs and the data select signals. The 2-to-1 switch 210 (FIG. 3), in step 620, receives a number of data inputs. At approximately the same time, the 2-to-1 switch 210 (FIG. 3) receives, in step 630, a number of data select signals. In a preferred embodiment, the data inputs are received at a 2×1 MUX 312 (FIG. 3), while the data select signals are received at a logical OR gate 310 (FIG. 3). Moreover, in a preferred embodiment, the number of data inputs is two, and the number of data select signals is two. The 2-to-1 switch 210 (FIG. 3) then chooses, in step 640, at least half of the received 620 data inputs. Additionally, at approximately the same time, the 2-to-1 switch 210 (FIG. 3) chooses, in step 650, at least half of the received 630 data select signals. Thus, in the preferred embodiment, one of the two data inputs is chosen by the 2×1 MUX 312 (FIG. 3), while one of the two data select signals (i.e., the "high" input to the logical OR gate 310 (FIG. 3)) is chosen by the logical OR gate 310 (FIG. 3). The 2-to-1 switch 210 (FIG. 3) then outputs, in step 660, the chosen 640 data inputs in response to a clock signal 280 (FIG. 3). Additionally, the 2-to-1 switch 210 (FIG. 3) outputs, in step 670, the chosen 650 data select signals in response to the clock signal 280 (FIG. 3). Hence, in the preferred embodiment, the one chosen 640 data input and the one chosen 650 data select signal are outputted 660, 670 by the 2-to-1 switch 210 (FIG. 3). Again, the outputting steps 660, 670 may be responsive to either a rising edge or, alternatively, a falling edge of the clock signal 280 (FIG. 3).

As shown from the method steps of FIGS. 5 and 6, the system provides a data valid signal at the end of the iterative process at each layer, thereby increasing robustness.

Although an exemplary embodiment of the present invention has been shown and described, it will be apparent to those of ordinary skill in the art that a number of changes, modifications, or alterations to the invention as described may be made, none of which depart from the spirit of the present invention. For example, while a D flip-flop is shown as a mechanism for providing a constant insertion delay, it will be clear to one of ordinary skill in the art that other types of flip-flops or latches may be used to accomplish substantially the same result. Additionally, while a 2-to-1 switch is specifically used to demonstrate the modularity or scalability of the system, it will be clear to one of ordinary skill in the art that other m-to-1 switches may be used in a modular fashion. Moreover, while two-input logical OR gates and 2×1 MUXs have been used to illustrate the simplest switch, it will be clear to one of ordinary skill in the art that multiple-input logical OR gates may be used for greater number of inputs. Additionally, the 2×1 MUX may be replaced by an m×1 MUX if greater inputs to a single switch are desired. These, and all such other changes, modifications, and alterations should therefore be seen as within the scope of the present invention.

We claim:

1. A switching system, comprising:
 a clock signal having a rising edge and a falling edge;
 $2^K$ data inputs and $2^K$ data select signals;
 K layers of switches, wherein each $j^{th}$ layer is configured to receive $2^{K-(j-1)}$ data inputs and propagate $2^{K-j}$ of the $2^{K-(j-1)}$ data inputs, wherein each $j^{th}$ layer is further configured to receive $2^{K-(j-1)}$ data select signals and propagate $2^{K-j}$ of the $2^{K-(j-1)}$ data select signals, wherein each layer comprises $2^{K-j}$ switches, wherein each of the $2^{K-j}$ switches comprises:
  a logical OR gate configured to receive at least two select signals and generate a data valid signal;
  a multiplexer (MUX) configured to receive at least two data input signals and one of the at least two select signals, the MUX further configured to generate a data output;
  a first flip flop configured to receive the data valid signal and release the data valid signal in response to the rising edge of the clock signal; and
  a second flip flop configured to receive the data output and release the data output in response to the rising edge of the clock signal.

2. A switching system, comprising:
 a clock signal having a rising edge and a falling edge;
 switches, wherein each switch comprises:
  a logical OR gate configured to receive at least two select signals and generate a data valid signal;
  a multiplexer (MUX) configured to receive at least two data input signals and one of the at least two select signals, the MUX further configured to generate a data output; and a first flip flop configured to receive the data valid signal and release the data valid signal in response to the rising edge of the clock signal;
a second flip flop configured to receive the data output and release the data output in response to the rising edge of the clock signal;
up to $2^K$ data inputs and up to $2^K$ data select signals;
a first layer of switches having $2^{K-1}$ switches, wherein the first layer is configured to receive the up to $2^K$ data inputs and propagate $2^{K-1}$ of the up to $2^K$ data inputs, wherein the first layer is further configured to receive the up to $2^K$ data select signals and propagate $2^{K-1}$ of the up to $2^K$ data select signals; and
K−1 additional layers of switches, wherein each $j^{th}$ layer of the K−1 additional layers is configured to receive $2^{K-(j-1)}$ data inputs and propagate $2^{K-j}$ of the $2^{K-(j-1)}$ data inputs, wherein each $j^{th}$ layer is further configured to receive $2^{K-(j-1)}$ data select signals and propagate $2^{K-j}$ of the $2^{K-(j-1)}$ data select signals, wherein each K−1 additional layer comprises $2^{K-j}$ switches.

3. A switch comprising:
a clock having a clock signal;
a logical OR gate having two OR inputs and an OR output;
a first flip-flop configured to receive the OR output and propagate the OR output in response to the clock signal;
a multiplexer (MUX) having a first MUX input, a second MUX input, a MUX output, and a MUX select, wherein the MUX select is one of the two OR inputs; and
a second flip-flop configured to receive the MUX output and propagate the MUX output in response to the clock signal.

4. A switch comprising:
a logical OR gate configured to receive at least two select signals and generate a data valid signal;
a multiplexer (MUX) configured to receive at least two data input signals and one of the at least two select signals, the MUX further configured to generate a data output;
a first flip flop configured to receive the data valid signal and release the data valid signal in response to a clock signal; and
a second flip flop configured to receive the data output and release the data output in response to the clock signal.

5. The system of claim 4, wherein the first flip flop is configured to release the data valid signal in response to a rising edge of the clock signal.

6. The system of claim 4, wherein the first flip flop is configured to release the data valid signal in response to a falling edge of the clock signal.

7. The system of claim 4, wherein the second flip flop is configured to release the data output in response to a rising edge of the clock signal.

8. The system of claim 4, wherein the second flip flop is configured to release the data output in response to a falling edge of the clock signal.

9. A system, comprising:
data select signals;
data inputs; and
a switching system configured to receive the data select signals and the data inputs, the switching system further configured to produce a data valid signal in response to the received data select signals, the switching system further configured to generate a data output from the data inputs in response to the data select signals, wherein the switching system comprises a plurality of switches.

10. The system of claim 9, wherein each of the plurality of switches comprises:
a logical OR gate configured to receive at least two select signals and generate a data valid signal;
a multiplexer (MUX) configured to receive at least two data input signals and one of the at least two select signals, the MUX further configured to generate a data output;
a first flip flop configured to receive the data valid signal and release the data valid signal in response to a clock signal; and
a second flip flop configured to receive the data output and release the data output in response to the clock signal.

11. The system of claim 10, wherein the first flip flop is configured to release the data valid signal in response to a rising edge of the clock signal.

12. The system of claim 10, wherein the first flip flop is configured to release the data valid signal in response to a falling edge of the clock signal.

13. The system of claim 10, wherein the second flip flop is configured to release the data output in response to a rising edge of the clock signal.

14. The system of claim 10, wherein the second flip flop is configured to release the data output in response to a falling edge of the clock signal.

15. A switching method comprising the steps of:
(a) receiving a number of data inputs and a number of data select signals, wherein the number of data inputs and the number of data select signals is the same;
(b) choosing at least half of the received data inputs and at least half of the received data select signals, wherein the chosen number of data inputs and the chosen number of data select signals is the same, wherein the at least half of the received data inputs and at least half of the received data select signals is a power of 2;
(c) outputting the chosen data inputs and the chosen data select signals;
(d) sequentially repeating steps (a) through (c) until only one data input and only one data select signal is outputted.

16. A method comprising the steps of:
(a) receiving a number of data inputs;
(b) choosing at least half of the received data inputs;
(c) outputting the chosen data inputs;
(d) receiving a number of data select signals;
(e) choosing at least half of the received data select signals; and
(f) outputting the chosen data select signals.

17. The method of claim 16, wherein the step of choosing at least half of the received data inputs comprises the step of selecting a number of received data inputs such that the selected number of received data inputs is a power of 2.

18. The method of claim 16, further comprising the step of repeating steps (a) through (c) until only one data input is outputted.

19. The method of claim 17, wherein the step of choosing at least half of the received data select signals comprises the step of selecting a number of received data selects signals such that the selected number of received data select signals is a power of 2.

20. The method of claim 17, further comprising the step of repeating steps (d) through (f) until only one data select signal is outputted.

21. The method of claim 17, wherein step (d) and step (f) are responsive to a clock signal having a rising edge and a falling edge.

22. The method of claim 21, wherein step (d) and step (f) are further responsive to the rising edge of the clock signal.

23. The method of claim 21, wherein step (d) and step (f) are further responsive to the falling edge of the clock signal.

24. A switching system comprising:
 means for receiving a number of data inputs and a number of data select signals, wherein the number of data inputs and the number of data select signals is the same;
 means for choosing at least half of the received data inputs and at least half of the received data select signals, wherein the chosen number of data inputs and the chosen number of data select signals is the same, wherein the at least half of the received data inputs and at least half of the received data select signals is a power of 2; and
 means for outputting the chosen data inputs and the chosen data select signals.

25. A switch comprising:
 means for receiving a number of data inputs;
 means for choosing at least half of the received data inputs; and
 means for outputting the chosen data inputs;
 means for receiving a number of data select signals;
 means for choosing at least half of the received data select signals; and
 means for outputting the chosen data select signals.

26. The switch of claim 25, wherein the means for choosing at least half of the received data inputs comprises means for selecting a number of received data inputs such that the selected number of received data inputs is a power of 2.

27. The switch of claim 25, wherein the means for choosing at least half of the received data select signals comprises means for selecting a number of received data selects signals such that the selected number of received data select signals is a power of 2.

28. A switch comprising:
 means for receiving at least two select signals;
 means for generate a data valid signal from the at least two select signals;
 means for receiving at least two data input signals and one of the at least two select signals;
 means for generating a data output from the at least two data input signals in response to the one of the at least two select signals;
 means for receiving the data valid signal;
 means for releasing the data valid signal in response to a clock signal;
 means for receiving the data output; and
 means for releasing the data output in response to the clock signal.

* * * * *